United States Patent [19]
Genero et al.

[11] Patent Number: 5,619,777
[45] Date of Patent: Apr. 15, 1997

[54] ENGAGING DEVICE

[76] Inventors: Claude P. Genero; Gail A. Genero, both of 30 Phillips Street, Dianella Western Australia 6062, Australia

[21] Appl. No.: 541,510

[22] Filed: Oct. 10, 1995

[30] Foreign Application Priority Data

Oct. 11, 1994 [AU] Australia ................. PM8709

[51] Int. Cl.⁶ .................................................. A41F 1/00
[52] U.S. Cl. .................. 24/495; 24/327; 24/337; 24/498
[58] Field of Search ................... 24/715, 265 WS, 24/324, 3.13, 327, 337, 495, 498

[56] References Cited

U.S. PATENT DOCUMENTS

| | | | |
|---|---|---|---|
| 3,807,675 | 4/1974 | Seckerson et al. | 248/73 |
| 4,071,930 | 2/1978 | Tanaka | 24/252 R |
| 4,240,604 | 12/1980 | Brach | 248/316 D |
| 4,514,885 | 5/1985 | Delahousse et al. | 24/557 |
| 4,716,811 | 1/1988 | Johnson | 24/495 X |
| 4,870,722 | 10/1989 | Shell, Jr. | 24/16 R |
| 5,446,948 | 9/1995 | Genero et al. | 24/327 |

FOREIGN PATENT DOCUMENTS

| | | |
|---|---|---|
| 639708 | 7/1950 | United Kingdom . |
| 1104589 | 2/1968 | United Kingdom . |
| 1212248 | 11/1970 | United Kingdom . |
| 2270344 | 9/1993 | United Kingdom . |

*Primary Examiner*—Peter M. Cuomo
*Assistant Examiner*—Stephen Vu

[57] ABSTRACT

An engaging device comprising a supporting part and an engaging part mounted on the supporting part for pivotal movement about two spaced apart axes between two stable conditions, one being an engaging condition and the other being a release condition. A portion of the engaging part disposed between the two axes is of resiliently compressible construction to accommodate movement of the engaging part between the two stable conditions. The portion of the engaging part is provided with a formation which biases the portion to deflect towards one lateral side thereof as the engaging part moves between the two stable conditions.

20 Claims, 5 Drawing Sheets

1

ENGAGING DEVICE

TECHNICAL FIELD

This invention relates to an engaging device for releasably engaging an object. The engaging device may find application in various fields where it is necessary to releasably engage an object in a simple and effective yet durable manner.

BACKGROUND ART

The present invention is an improvement of an invention relating to an engaging device which is described and illustrated in our U.S. Pat. No. 5,446,948 the contents of which are incorporated herein by way of reference. The engaging device disclosed in U.S. Pat. No. 5,446,948 comprises a supporting part and an engaging part mounted on the supporting part for pivotal movement about two spaced apart axes between two stable conditions, one being an engaging condition and the other being a release condition. A portion of the engaging part disposed between the two axes is of resiliently compressible construction to accommodate movement of the engaging part between the two stable conditions and to urge the engaging part into one or the other of the two stable conditions. Compressive stresses are induced into said portion of the engaging part as the engaging part moves between the two stable conditions thereby to urge the engaging part towards one of or the other of the two stable conditions with a snap-action. The two pivot axes about which the engaging part pivots are permanently fixed against lateral displacement with respect to each other during movement of the engaging part between the two stable conditions. The engaging part comprises two spaced arm portions and an elongated bridge portion extending between the arm portions. The arm portions are each mounted on the supporting part for pivotal movement about a respective one of the pivot axes between a first position corresponding to said release condition. With this arrangement, the bridge portion provides said portion disposed between the pivot axes. The bridge portion is resiliently bendable in two mutually perpendicular directions to provide the resilient compression. The two mutually perpendicular directions comprises a first direction generally parallel with the pivot axes and a second direction being in the direction of movement of said bridge portion as the engaging part moves between the two stable conditions. The bridge portion is provided with a reduced section to accommodate the resilient deflection. The reduced section comprises a flexure point formed in the bridge portion.

While the invention disclosed in U.S. Pat. No. 5,446,948 performs satisfactorily, there is no control over the particular side to which the bridge portion deflects when undergoing resilient compression. In some instances the bridge portion may deflect laterally to one of its sides and in other instances it may deflect laterally to the other of its sides.

It would be advantageous in some applications of the engaging device to provide an arrangement in which the lateral side to which the bridge portion deflects when moving between the two stable conditions remains constant and predictable.

The present invention seeks to provide such an arrangement.

SUMMARY DISCLOSURE OF THE INVENTION

The present invention provides the engaging part with a formation which biases the bridge portion to deflect towards one lateral side thereof as the engaging part moves between the two stable conditions.

In this way, the deflection of the bridge portion is constant and predictable when the engaging part goes from one stable condition to the other stable condition.

Thus in one form the invention resides in an engaging device comprising a supporting part, an engaging part mounted on the supporting part for pivotal movement about two spaced apart axes between two conditions one being an engaging condition and the other being a release condition, the engaging part comprising engaging means and a bridge portion, said bridge portion extending between said axes and being of deflectable construction whereby the bridge portion deflects in a direction perpendicular to the direction of movement of the bridge portion when moving from the engaging condition to the release condition upon application of a force of sufficient magnitude to the engaging means and wherein said bridge portion is provided with a formation for biasing said deflection towards said direction perpendicular to said direction of movement of the bridge portion when moving from the engaging condition to the release condition.

The formation may comprise a weakening in said bridge portion to influence said bridge portion to deflect in the manner described. The weakening may comprise a groove formed in said bridge portion on a face thereof opposite to said direction perpendicular to said direction of movement of the bridge portion when moving from the engaging condition to the release condition.

In another form the invention resides in an engaging device comprising a supporting part, an engaging part mounted on the supporting part for pivotal movement about two spaced apart axes between two conditions one being an engaging condition and the other being a release condition, the engaging part comprising engaging means and a bridge portion, said bridge portion extending between the two axes and being of resiliently deflectable construction to accommodate movement of the engaging part between the two conditions and to urge the engaging part into one or the other of the two conditions, whereby the bridge portion deflects in a direction perpendicular to the direction of movement of the bridge portion when moving from the engaging condition to the release condition upon application of a force of sufficient magnitude to the engaging means and wherein said bridge portion is provided with a formation for biasing said deflection towards said direction perpendicular to said direction of movement of the bridge portion when moving from the engaging condition to the release condition.

In another form the invention resides in an engaging device comprising a supporting part, an engaging part mounted on the supporting part for pivotal movement about two spaced apart axes between two conditions one being an engaging condition and the other being a release condition, the engaging part comprising engaging means and a bridge portion, said bridge portion extending between said axes and being of deflectable construction whereby the bridge portion deflects in a direction perpendicular to the direction of movement of the bridge portion when moving from the engaging condition to the release condition upon application of a force of sufficient magnitude to the engaging means and wherein said bridge portion is provided with means for biasing said deflection towards said direction perpendicular to said direction of movement of the bridge portion when moving from the engaging condition to the release condition.

With these arrangements, the path of the engaging part as it moves from one stable position to the other is always uniform and consistent. This is important when mass producing engaging devices which require exactness and accuracy in the magnitude of force required to move the engaging part from one stable position to the other.

BEST MODES OF CARRYING OUT THE INVENTION

Referring now to FIGS. 1 to 7 of the drawings, the engaging device 10 according to the first embodiment is adapted to releasably engage an object 11 of rectangular cross-section. The engaging device of this embodiment can engage and release the object simply by pushing it into contact with the object and pulling it out of contact with the object, as will be explained later.

Figure 4:
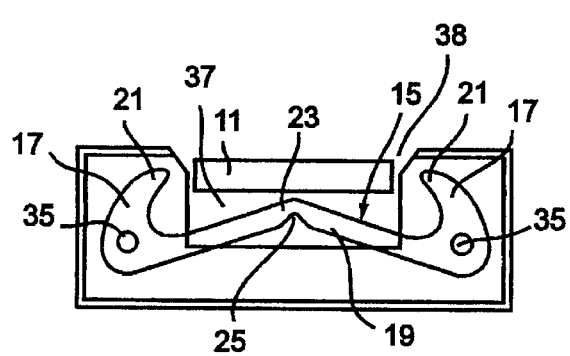
FIG. 4 is a plan view of the engaging device according to the first embodiment shown in a release position but in readiness to engage an object.
Figure 5:
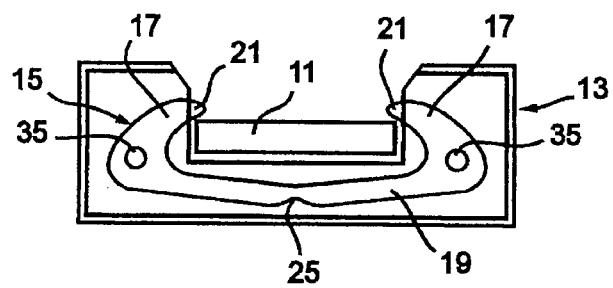
FIG. 5 is a view similar to FIG. 4 with the exception that the engaging device is shown in an engaging position in which it has engaged the object.

The engaging device 10 comprises a supporting part 13 and an engaging part 15 mounted on the supporting part for movement between two stable conditions, one being an engaging condition (as shown in FIG. 5 of the drawings) in which the engaging device is in engagement with the object 11 and the other being a release condition (as shown in FIG. 4 of the drawings) in which the object 11 can be separated from the engaging device.

The engaging part 15 comprises a pair of spaced arm portions 17 and an elongated bridge portion 19 extending between the arm portions 17. The arm portions 17 are so configured that the free ends thereof define claws 21 which can close around the object 11 when the engaging device is in the engaging condition.

Figure 1:
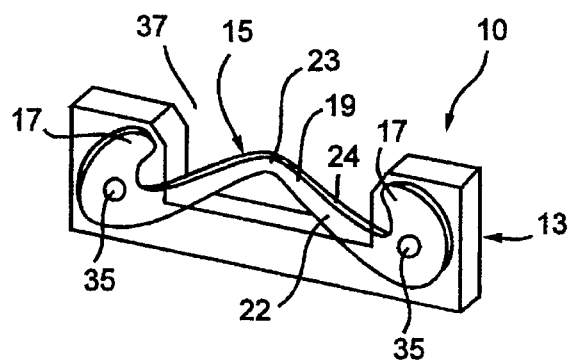
FIG. 1 is a perspective view of an engaging device according to a first embodiment.
Figure 2:
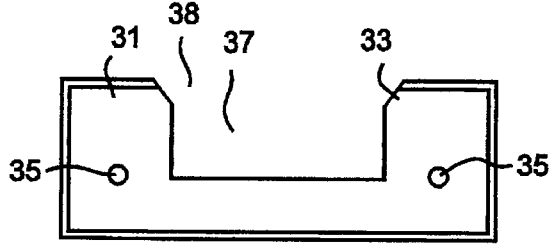
FIG. 2 is a schematic plan view of a supporting part of the engaging device according to the first embodiment.
Figure 3:
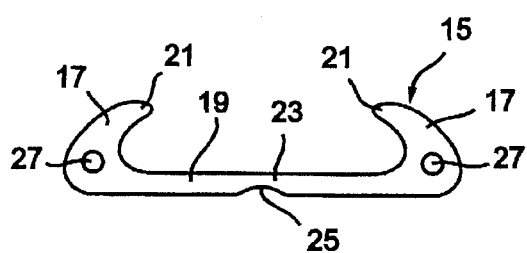
FIG. 3 is a schematic plan view of an engaging part of the engaging device according to the first embodiment.

The bridge portion 19 comprises two opposed faces 20, 22 which are closely positioned such that the bridge portion presents a thin profile at edges 24, as seen in FIG. 1.

The bridge portion 19 is resiliently bendable laterally to the side thereof corresponding to face 22, as will be explained in more detail later. The bridge portion is also constructed to be bendable along its length in a direction generally perpendicular to the lateral direction referred to previously. Such a construction may be achieved by providing the bridge portion 19 with a reduced section 23 which facilitates the bending action. In this embodiment, the reduced section 23 comprises a flexure point 25 formed in the bridge portion. The flexure point 25 serves to divide the engaging part 15 into two sections which can bend with respect to each other at the flexure point in the two mutually perpendicular directions, both of which are transverse to the longitudinal axis of the bridge portion.

The engaging part 15 is provided with a pivot hole 27 in each arm portion 17 at a location between the bridge portion and the free end of the arm.

The supporting part 13 comprises a housing 31 having a cavity which accommodates the engaging part 15, the cavity being defined between a pair of spaced apart housing walls 33. A pair of pivot pins 35 extend between, and are rigidly supported at their respective ends on, the housing walls. As the pivot pins 35 are rigidly supported at their ends on the housing walls, they are fixed against movement with respect to each other. The supporting part 13 accommodates the engaging part 15 in the housing 31 with the pivot pins 35 received within the pivot holes 27 in the engaging part. With this arrangement, the pivot pins 35 define pivot axes about which the arm portions 17 can pivot on movement of the engaging part between the engaging and release conditions.

The housing also has a recess 37 for receiving the object 11 to be engaged by the engaging device. The recess 37 opens at 38 onto an edge of the housing. The engaging part is disposed within the housing such that when it is in the engaging condition (as shown in FIG. 5 of the drawings) the claws 21 extend into the recess and the bridge portion is disposed partly or wholly within the confines of the housing. On the other hand, when the engaging part is in the release condition (as shown in FIG. 4 of the drawings) the claws 21 are retracted from the recess and the central region of the bridge portion 19 extends into the recess from the side of the housing opposite the opening at 38.

The bridge portion 19 is movable between two extreme positions one being a first position corresponding to the engaging condition of the engaging part 15 (which condition is one of two stable conditions of the engaging part) and the other being a second condition corresponding to the release condition (which condition is the other of the two stable conditions).

The spacing between the pivot pins 35 is fixed and is less than the distance between the pivot holes 27 in the engaging part 15 prior to fitting of the engaging part on the supporting part. Consequently, the bridge portion 19 is in a state of axial compression and undergoes further axial compression as it moves between the two extreme positions. There is an unstable zone between the two extreme positions which results in the bridge portion being urged into one or the other of the two extreme positions. As the bridge portion passes through the unstable zone, it moves through an "overtoggling" or "over-centre" condition in which the flexure point 25 crosses a line extending between the pivot axes defined by the pivot pins 35. The unstable condition of the bridge portion 19 arises because the bridge portion is caused to deflect resiliently as it passes through the unstable zone to accommodate movement between the two extreme positions. The resilient deflection occurs about the flexure point 25 with the two sections of the engaging part on opposed sides of the flexure point bending with respect to each other in the two mutually perpendicular directions.

Figure 6:
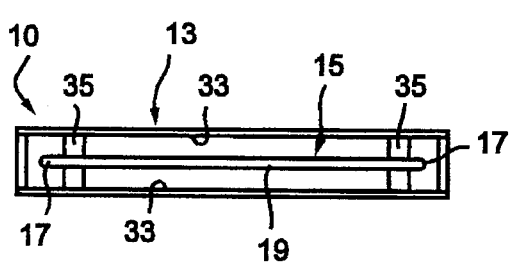
FIG. 6 is a side view showing the engaging device with the engaging part in a stable position corresponding to either the engaging position or the release position of the engaging device.
Figure 7:
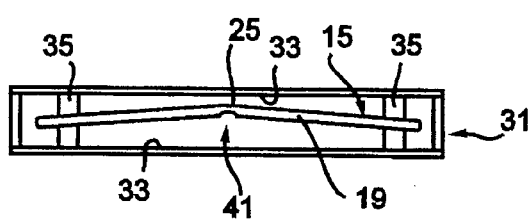
FIG. 7 is a view similar to FIG. 6 with the exception that the engaging part is shown in an unstable position in which the bridge portion of the engaging part has deflected laterally in a direction generally parallel to the axes about which the engaging part pivots.

Bending of the bridge portion in one of the mutually perpendicular directions can be seen by reference to FIGS. 6 and 7 of the drawings. In FIG. 6, the bridge portion is shown in a normal (undeflected) condition as is the case when it is at either one of the two extreme positions. In FIG. 7, the bridge portion is shown in a condition where it has undergone bending in the lateral direction to the side thereof corresponding to face 22. This bending introduces stresses into the bridge portion which urge it to one or the other of extreme positions.

Bending of the bridge portion in the other of the mutually perpendicular directions can be seen by reference to FIGS. 4 and 5 where it is evident that the inclination between the two sections of the bridge portion on opposed sides of the flexure point 25 has changed.

Figure 9:
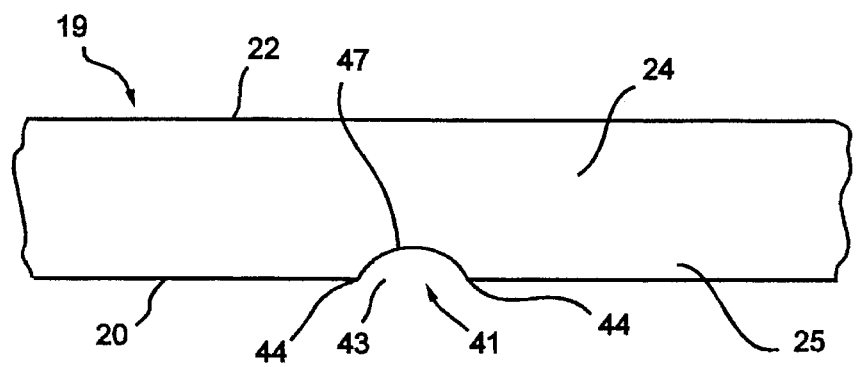
FIG. 9 is a fragmentary view of the other side of the central region of the bridge portion of the engaging part according to the first embodiment.
Figure 10:
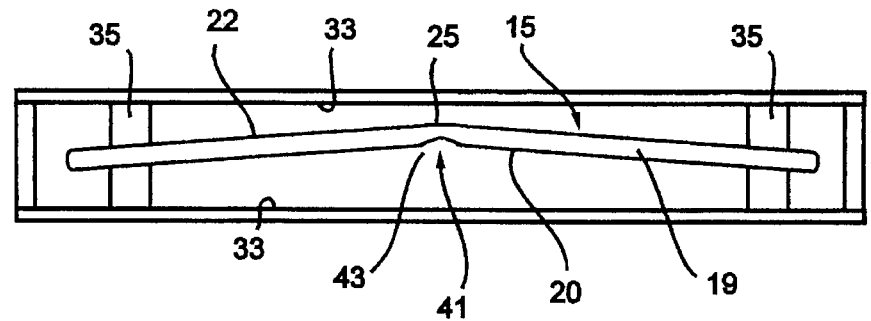
FIG. 10 is a view similar to FIG. 7 but on an enlarged scale.

The engaging part 15 is provided with a formation 41 in the form of a weakening which serves to bias the bridge portion 19 to deflect laterally to the side thereof corresponding to face 22 opposite the weakening, as shown in FIG. 10. This ensures that the lateral deflection of the bridge portion 19 is constant and predictable when the engaging part 15 goes from one stable position to the other. The weakening 41 is achieved in this embodiment by the provision of a groove 43 on the face 20 of the bridge portion 19 at the flexure point 25. The groove 43 which extends between the opposed edges 24 of the bridge portion 19 has a pair of longitudinal edges 44 which are generally parallel. In this embodiment, the groove 43 is deeper at one end 45 thereof than at the other end 47 thereof, as can be seen from FIGS. 8 and 9. The groove can, however, be of a generally constant depth in other arrangements.

With this arrangement, the path followed by the engaging part when moving from one stable condition to the other stable condition is always consistent and predictable. Without the provision of the weakening 41, the path followed by the engaging part 15 when moving between the stable conditions can be erratic and can result in variations in the magnitude of the force required to move the engaging part from one stable position to the other.

Figure 8:
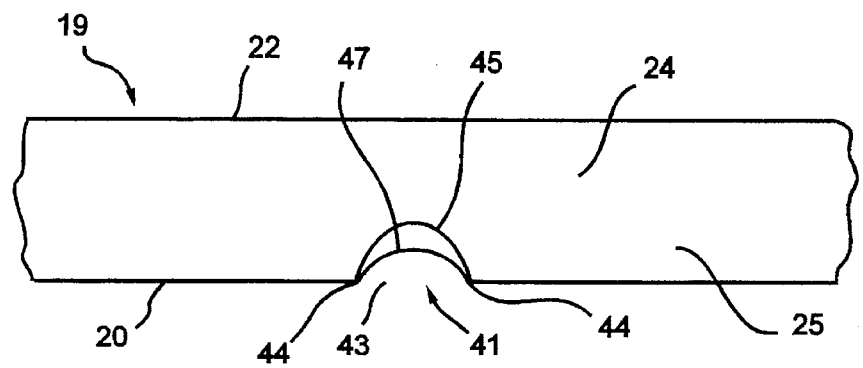
FIG. 8 is a fragmentary view of one side of the central region of the bridge portion of the engaging part according to the first embodiment.
Figure 11:
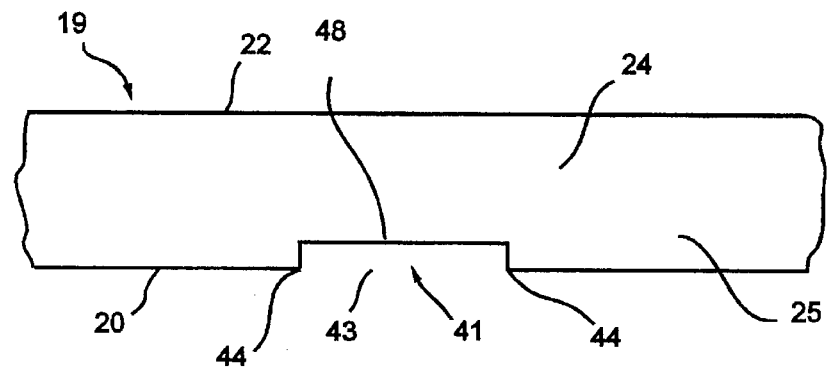
FIG. 11 is a fragmentary view of one side of the central region of the bridge portion of an engaging part of an engaging device according to the second embodiment.
Figure 12:
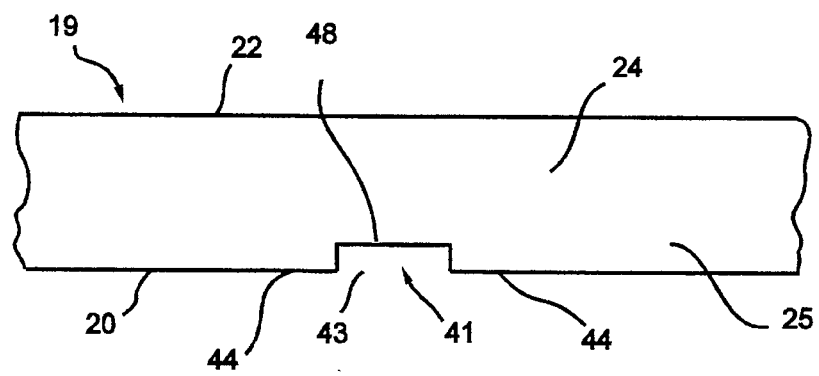
FIG. 12 is a fragmentary view of the other side of the central region of the bridge portion of the engaging part according to the second embodiment.
Figure 13:
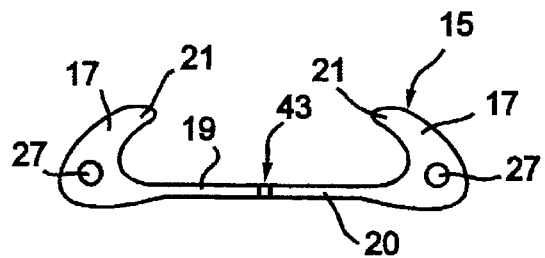
FIG. 13 is a plan view of the engaging part of an engaging device according to a third embodiment.

The embodiment shown in FIGS. 11 and 12 is somewhat similar to the embodiment shown in FIGS. 8, 9 and 10. In this embodiment, however, the groove 43 has longitudinal edges 44 which diverge with respect to each other such that one end 48 thereof is wider than the other end 49 thereof.

Where the bridge portion 19 does not comprise a flexure point, as is the case in the embodiment shown in FIG. 13, the groove 43 can be situated in the central region of one face 20.

Figure 14:
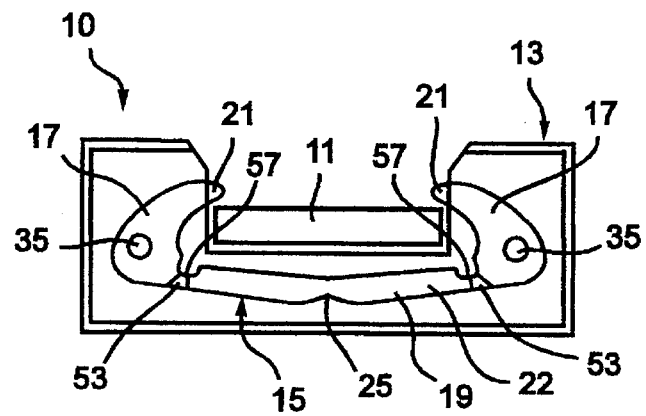
FIG. 14 is a plan view of an engaging device according to another embodiment shown in an engaging condition.
Figure 15:
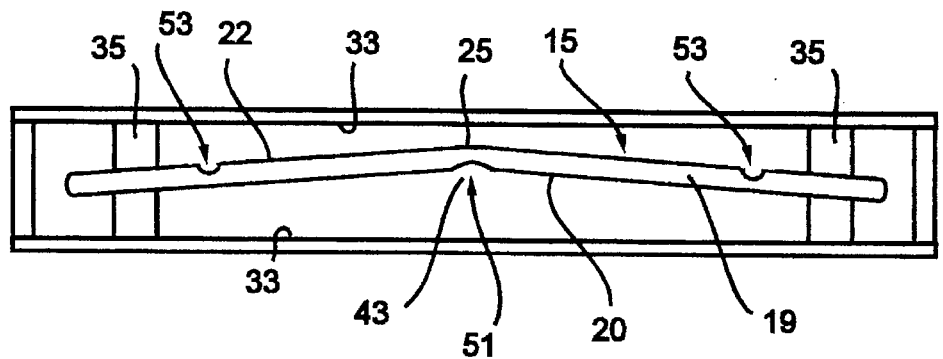
FIG. 15 is a side view (on an enlarged scale) showing the engaging device of FIG. 14 with the engaging part shown in an unstable position.

The engaging part 15 may be provided with more than one weakening 41. An example of such an arrangement is provided by the embodiment illustrated in FIGS. 14 and 15. In this embodiment, there are a plurality of weakenings 41 on the face 20, 22 of the bridge portion 19. The weakenings 41 comprise a groove 51 located on the flexure point 25, and two further grooves 53 each of which is located towards one of the pivot pins 35. The groove 51 and grooves 53 are located in an opposed relationship to one another, as best seen in FIG. 15. The grooves 53 in this embodiment are associated with reduced sections 57 formed in the engaging part.

In another embodiment, the grooves 51, 53 may be on the same face of the engaging part 15.

In still another embodiment, the central groove 51 may not be present.

Figure 16:
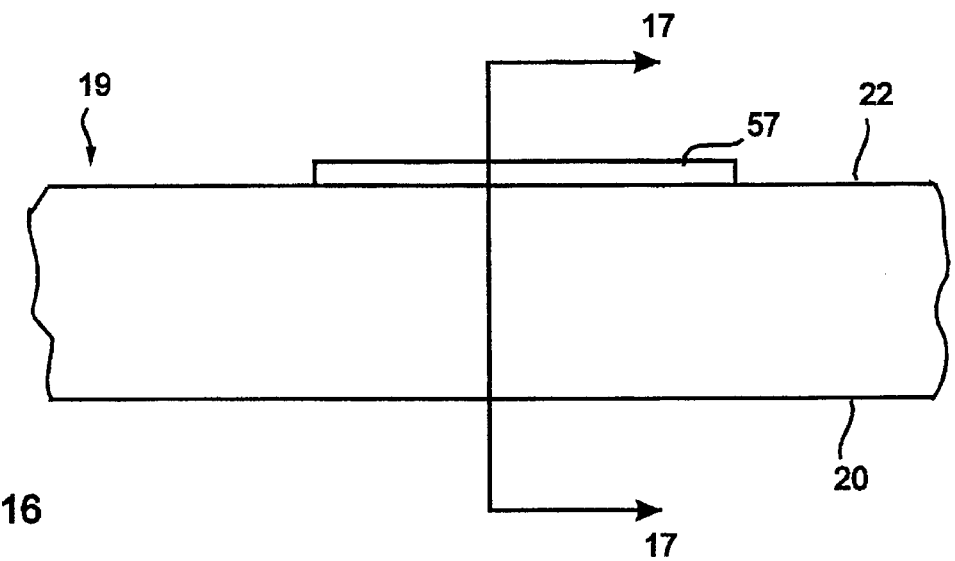
FIG. 16 is a fragmentary view (on an enlarged scale) of the central region of the bridge portion of an engaging device according to a further embodiment.
Figure 17:
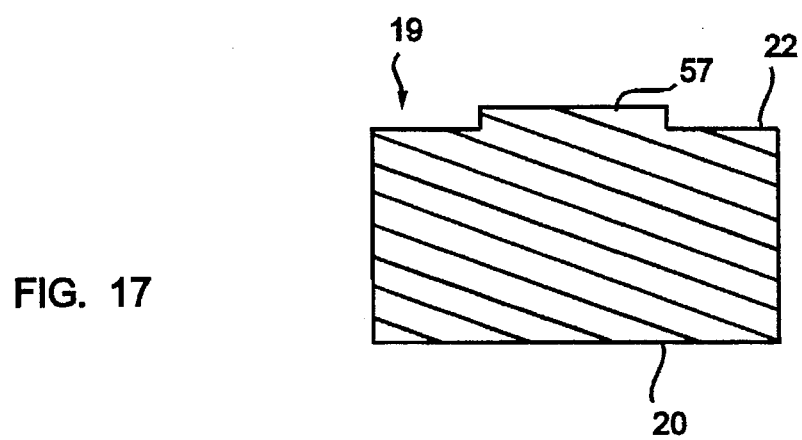
FIG. 17 is a cross-section on line 17—17 of FIG. 16.

In the various embodiments which have been described, the formation 41 on the engaging part 15 has been in the form of a weakening. It should be understood that the formation can take other forms. One such other form of formation is illustrated in the embodiment shown in FIGS. 16 and 17 where the formation comprises a reinforcement 57 on the face 20 of the engaging part 15 facing the side to which the bridge portion 19 deflects laterally.

The reinforcement 57 may comprise a strengthening rib formed integrally with the bridge portion 19.

The reinforcement 57 acts to resist lateral deflection towards the side opposite to that on which it is located, and thus influences the direction of deflection of the bridge portion 19.

Figure 18:
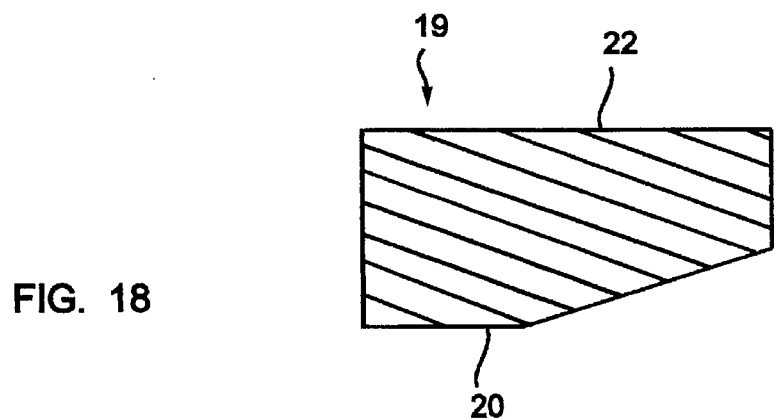
FIG. 18 is a cross-sectional view of the central region of the bridge portion of an engaging device according to a still further embodiment.

In another embodiment, which is shown in FIG. 18, the formation may be the provision of faces 20, 22 of the bridge portion 19 in different widths. The face 20 is of smaller width that face 22 and so accommodates deflection of the bridge portion 19 to the side corresponding to face 22.

From the foregoing, it is evident that the formation can be of any suitable arrangement, it only being necessary that it creates an imbalance between the two faces of the resilient portion of the bridge portion so that the bridge portion favours deflection to one lateral side over the other. This feature ensures consistency in the path that the bridge portion follows when moving from one stable position to the other.

The engaging device according to these embodiments is particularly advantageous as it ensures a better performance when there is a need to manufacture a large number of engaging devices which require the exact same magnitude of force to move the engaging part from one stable position to the other.

The above embodiments relate to an engaging device with fixed pivot axes, however, the present invention is also applicable and suitable for somewhat similar engaging devices provided with laterally deflectable pivot axes as disclosed in GB Pat. No. 1212248 (Western), U.S. Pat. No. 4,240,604 (Brach) and GB Pat. App. No. 2270344A (Genero) when a portion of the engaging part disposed between the two pivot axes is of resiliently compressible construction.

Finally, it should be appreciated that the scope of the invention is not limited to the scope of the embodiments described.

We claim:

1. An engaging device comprising a supporting part, an engaging part mounted on the supporting part for pivotal movement about two spaced apart axes between two conditions one being an engaging condition and the other being a release condition, the engaging part comprising engaging means and a bridge portion, said bridge portion extending between said axes and being of deflectable construction whereby the bridge portion deflects in a direction perpendicular to the direction of movement of the bridge portion when moving from the engaging condition to the release condition upon application of a force of sufficient magnitude to the engaging means and wherein said bridge portion is provided with a formation for biasing said deflection towards said direction perpendicular to said direction of movement of the bridge portion when moving from the engaging condition to the release condition.

2. An engaging device according to claim 1 wherein the formation comprises a weakening in said bridge portion.

3. An engaging device according to claim 2 wherein the weakening comprises a groove formed in a face of the engaging part opposite to said direction perpendicular to said direction of movement of the bridge portion when moving from the engaging condition to the release condition.

4. An engaging device according to claim 3 wherein the groove is of substantially constant cross-section throughout the length thereof.

5. An engaging device according to claim 3 wherein the groove is of variable depth from one end thereof to the other end thereof.

6. An engaging device according to claim 3 wherein the groove is of variable width from one end thereof to the other end thereof.

7. An engaging device according to claim 1 wherein the engaging means comprises two spaced apart arm portions with the bridge portion extending therebetween, the bridge portion having a pair of opposed faces, the formation being provided on one of the opposed faces.

8. An engaging device according to claim 7 wherein the formation comprises a weakening on the face opposite to said direction perpendicular to said direction of movement of the bridge portion when moving from the engaging condition to the release condition.

9. An engaging device according to claim 8 wherein the engaging part is provided with at least one further weakening.

10. An engaging device according to claim 9 wherein the further weakening is provided on the other of the opposed faces.

11. An engaging device according to claim 1 wherein the formation comprises a reinforcement provided on said bridge portion.

12. An engaging device according to claim 11 wherein the reinforcement is provided on a face of the engaging part facing said direction perpendicular to said direction of movement of the bridge portion when moving from the engaging condition to the release condition.

13. An engaging device according to claim 1 wherein the formation comprises the cross-sectional configuration of the engaging part.

14. An engaging device according to claim 13 wherein the cross-sectional configuration provides the engaging part with a pair of opposed faces, the opposed faces being of different dimensions to influence the engaging part to deflect towards said direction perpendicular to said direction of movement of the bridge portion when moving from the engaging condition to the release condition.

15. An engaging device comprising a supporting part, an engaging part mounted on the supporting part for pivotal movement about two spaced apart axes between two conditions one being an engaging condition and the other being a release condition, the engaging part comprising engaging means and a bridge portion, said bridge portion extending between the two axes and being of resiliently deflectable construction to accommodate movement of the engaging part between the two conditions and to urge the engaging part into one or the other of the two conditions, whereby the bridge portion deflects in a direction perpendicular to the direction of movement of the bridge portion when moving from the engaging condition to the release condition upon application of a force of sufficient magnitude to the engaging means and wherein said bridge portion is provided with a formation for biasing said deflection towards said direction perpendicular to said direction of movement of the bridge portion when moving from the engaging condition to the release condition.

16. An engaging device according to claim 15 wherein the formation comprises a weakening in said bridge portion.

17. An engaging device according to claim 16 wherein the weakening comprises a groove formed in a face of the engaging part opposite to said direction perpendicular to said direction of movement of the bridge portion when moving from the engaging condition to the release condition.

18. An engaging device according to claim 15 wherein the formation comprises a reinforcement provided on a face of the engaging part facing said direction perpendicular to said direction of movement of the bridge portion when moving from the engaging condition to the release condition.

19. An engaging device according to claim 15 wherein the formation comprises the cross-sectional configuration of the engaging part and wherein said cross-sectional configuration provides the engaging part with a pair of opposed faces, the opposed faces being of different dimensions to influence the engaging part to deflect towards said direction perpendicular to said direction of movement of the bridge portion when moving from the engaging condition to the release condition.

20. An engaging device comprising a supporting part, an engaging part mounted on the supporting part for pivotal movement about two spaced apart axes between two conditions one being an engaging condition and the other being a release condition, the engaging part comprising engaging means and a bridge portion, said bridge portion extending between said axes and being of deflectable construction whereby the bridge portion deflects in a direction perpendicular to the direction of movement of the bridge portion when moving from the engaging condition to the release condition upon application of a force of sufficient magnitude to the engaging means and wherein said bridge portion is provided with means for biasing said deflection towards said direction perpendicular to said direction of movement of the bridge portion when moving from the engaging condition to the release condition.

* * * * *